United States Patent [19]

Carll et al.

[11] Patent Number: 4,551,832

[45] Date of Patent: Nov. 5, 1985

[54] TELEPHONE BASED CONTROL SYSTEM

[75] Inventors: Richard T. Carll, Granby; Anthony J. Fastaia, Vernon, both of Conn.; Kurt von Nieda, Los Angeles, Calif.

[73] Assignee: United Technologies Corporation, Hartford, Conn.

[21] Appl. No.: 557,693

[22] Filed: Dec. 2, 1983

[51] Int. Cl.[4] ........................................... H04Q 11/04
[52] U.S. Cl. ..................................... 370/58; 179/2 A; 370/62
[58] Field of Search ..................... 370/62, 58; 179/2 A

[56] References Cited

U.S. PATENT DOCUMENTS

| | | | |
|---|---|---|---|
| 3,819,862 | 6/1974 | Hedges | 179/2 A |
| 4,174,064 | 11/1979 | Pratt | 179/2 A |
| 4,266,097 | 5/1981 | Cannon et al. | 179/2 A |
| 4,330,886 | 5/1982 | Fukuda et al. | 370/62 |
| 4,332,980 | 6/1982 | Reynolds et al. | 179/2 A |
| 4,390,750 | 6/1983 | Bartelink | 179/2 A |

Primary Examiner—Douglas W. Olms
Attorney, Agent, or Firm—Dominic J. Chiantera

[57] ABSTRACT

A telephone based control system comprises a central control console, a digital time division multiplexed (TDM) telephone system incuding a PBX matrix switch with signal ports adapted for direct connection to PBX primary port telset devices and to the central control console, and including primary port telsets adapted for connection to PBX secondary port devices, the control system further comprising secondary port control units, each connected to an associated one of the primary port telsets, for controlling the operation of one or more controlled devices located in proximity to the associated telsets.

6 Claims, 14 Drawing Figures

| MEMORY LOCATION (HEX) | BYTE FUNCTION | | | | | | | |
|---|---|---|---|---|---|---|---|---|
| 2C | SELECTED TV CHANNEL | | | | | | | |
| 2D | HVAC RELAY STATUS | | | | | | | |
| | ALRM | N/A | AUX | HISP | MHSP | LOSP | COOL COIL | HEAT COIL |
| 2F | EM CONTROL OPERATING MODE | | | | | | | |
| | NEW INFO | QUICK CNTRL | ACTIVE | FAN SP | LOW/OFF DFLT | FAN | HVAC | HEALTH |
| 30 | START COOL | | | | | | | |
| 31 | STOP HEAT | | | | | | | |
| 32 | STOP COOL | | | | | | | |
| 33 | START HEAT | | | | | | | |
| 34 | MIN ON CYCLE | | | | MIN OFF CYCLE | | | |
| 35 | KEY CODE | | | | | | | |
| 36 | COMMAND | | | | | | | |
| 43 | CH 5 | | CH 4 | | CH 3 | | CH 2 | |
| 57 | | | | | CH 83 | | CH 82 | |

TELEPHONE BASED CONTROL SYSTEM

CROSS REFERENCE TO RELATED APPLICATION

Some of the information disclosed herein is also disclosed, and claimed, in a commonly owned application of the same assignee entitled: HOTEL ENERGY MANAGEMENT, U.S. Ser. No. 557,694, filed on even date herewith by Pearlman et al.

DESCRIPTION

1. Technical Field This invention relates to control systems, and more particularly to telephone based control systems.

2. Background Art

Centralized control system architectures in which a central station controls the operation of a number of remote station devices, provides a high degree of control efficiency, and are well known in the art. The central control architecture is applicable to all types of control system applications including process control, information display, and energy management. The major cost in providing such a centralized control system involves the interconnection of the central station to remote station devices. In some situations, such as existing buildings not provided with internal communication links during construction, post construction wiring for central control system installation may be impractical from a cost standpoint, if not impossible.

BRIEF DESCRIPTION OF THE INVENTION

The object of the present invention is to provide a central control system based on a telephone PBX system for regulating, in addition to voice and/or data communication, the operation of remote devices.

According to the present invention, a telephone based control system comprises: a central control console, a digital time division multiplexed (TDM) telephone system including a PBX central equipment matrix switch with signal ports adapted for direct connection to PBX primary port telset devices (voice and/or data telephone equipment) and to the central control console, and including primary port telsets adapted for connection to PBX secondary port devices, the control system further comprising secondary port control units, each connected to an associated one of the primary port telsets, for controlling the operation of one or more controlled devices located in proximity to the associated telset, each control unit controlling in response to information presented to it from the central control console through the PBX matrix switch and associated telset, in combination with local sensed parameter signals and local command signals. In further accord with the present invention, all local command signals are operator entry commands from a controlled keypad associated with the primary port telset. In still further accord with the present invention all information from the central console to each control unit is provided in PBX system protocol, simultaneous with voice and/or data transmissions through the PBX system, whereby control information transfer is invisible to the PBX voice and/data transmission. In still further accord with the present invention the secondary port control units are microprocessor based with capability of direct local control of the controlled devices, subject to supervisory control by the central control.

The present PBX based control system provides for central supervisory control over remote control units associated with a PBX primary port telset. The control system is readily adaptable to any application. It is particularly useful in older building structures not having central wiring for remote control devices, by using the building's existing telephone system wiring.

These and other objects, features and advantages of the present invention will become more apparent in light of the following detailed description of a best mode embodiment thereof, as illustrated in the accompanying Drawing.

BEST MODE FOR CARRYING OUT THE INVENTION

Figure 1:
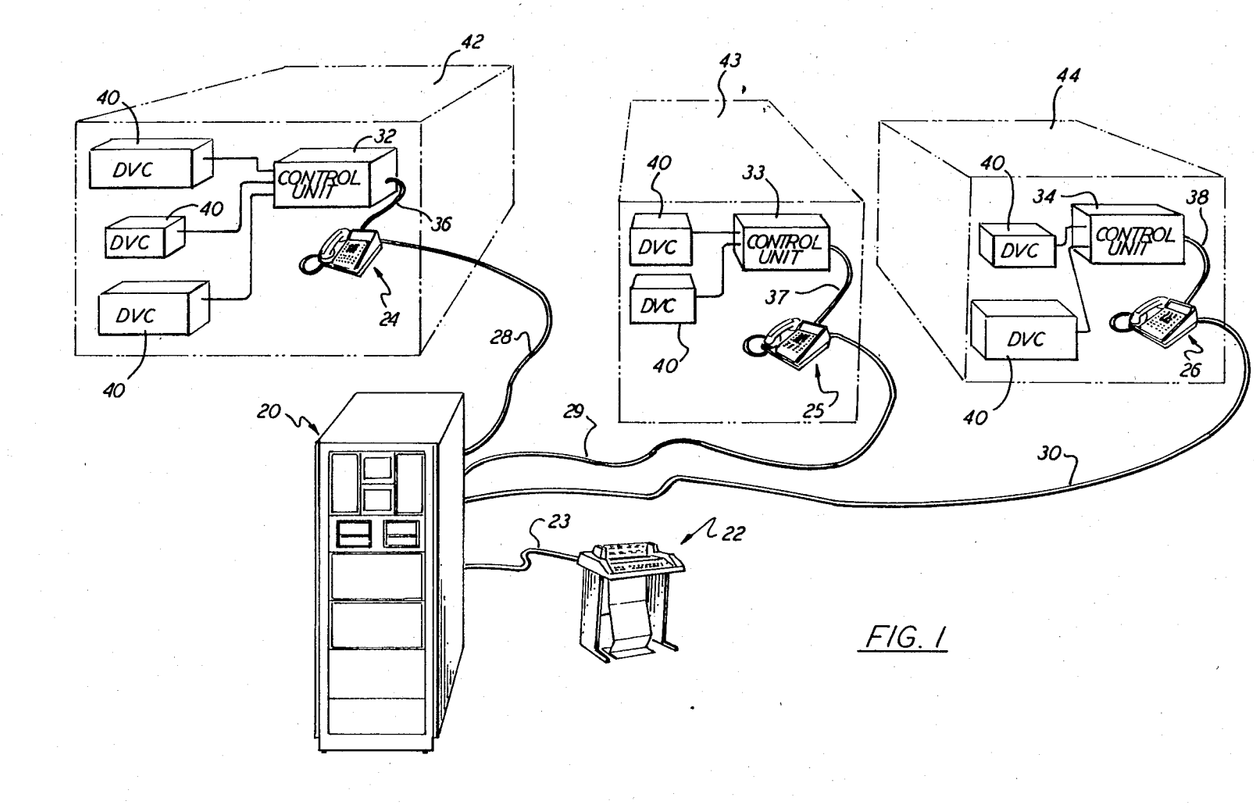
FIG. 1 is an artful perspective illustration of the present control system architecture.

FIG. 1 is a conceptual, perspective diagram of the present control system architecture. The system includes a central PBX matrix switch 20 with associated central control console 22 connected through signal ports (not shown) to a plurality of primary port telsets 24–26 through lines 28–30. The system includes secondary port control units 32–34, i.e. units which do not connect directly to a PBX port but instead are connected through lines 36–38 to an associated telset. Each control unit controls operation of one or more controlled devices 40 located in proximity 42–44 to the installed telsets. The central control console communicates through the control ORDER WIRE bits of the PBX protocol with each of the secondary port control units, simultaneous with PBX voice and/or data transmission from the associated telset. The central console 22 provides operator entry to the control system which resides in the PBX central equipment, to allow operator change in set point control, input new data, or to alter control procedures.

Figure 2:
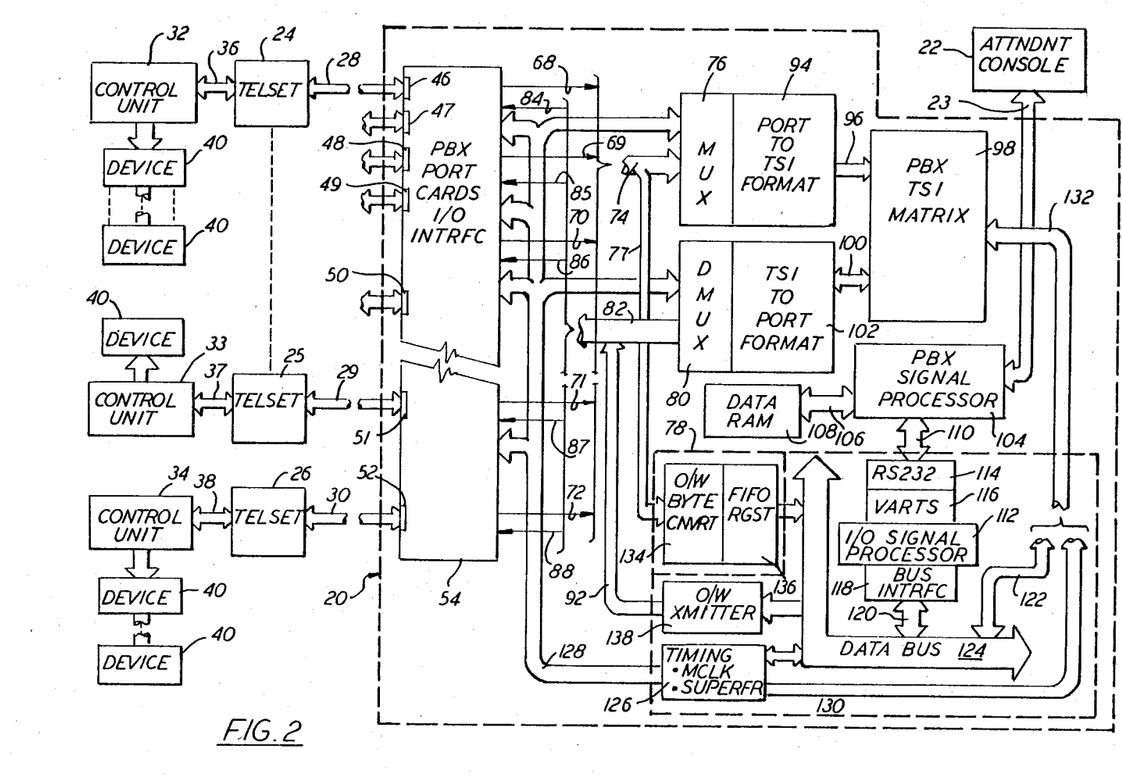
FIG. 2 is a system block diagram of the telephone based control system of FIG. 1.

FIG. 2 is a system block diagram of the present control system. The control units 32–34 and related controlled devices 40 are connected through lines 36–38 to the primary port telsets 24-26, which in turn are connected through lines 28-30 to the PBX central equipment 20. The telsets connect to the PBX through an associated one of signal connecting ports 46-52. Each port is uniquely identified to the PBX matrix switch, and the matrix interconnects ports thereby allowing communications between telsets.

The control system PBX is a digital, time division multiplexed (TDM) system. It may include any one of a number of known TDM techniques. Two of the most popular are Pulse Code Modulation (PCM) and Adaptive Delta Modulation (ADM). Other modulation schemes include Pulse Width Modulation (PWM), Pulse Amplitude Modulation (PAM), and Delta Modulation (DM). In the best mode embodiment an adaptive delta modulation (ADM) system is used, however, it should be understood that any one of the variously known digital modulation schemes may be used, as known to those skilled in the art.

Figure 3:
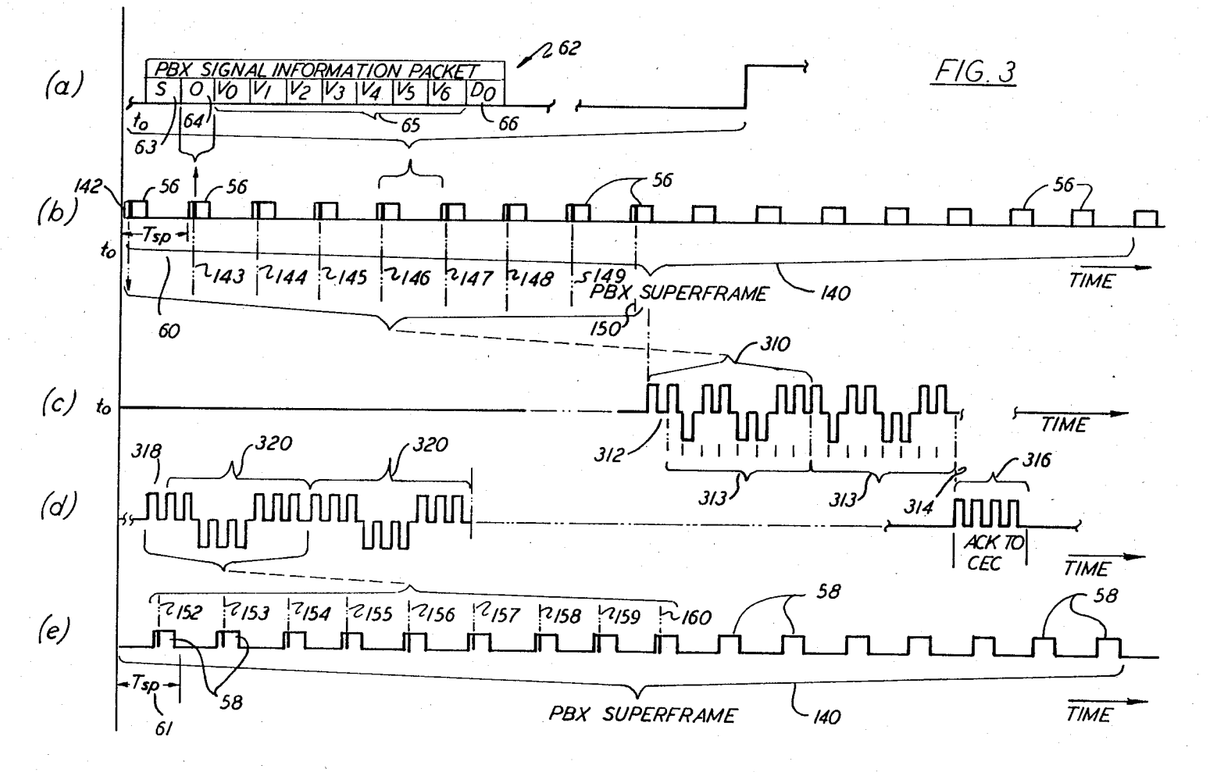
FIG. 3 is an illustration of signal waveforms used in the description of operation of the system of FIG. 1.

In an ADM PBX system communication between telsets and the matrix is by digital "packet transmission", i.e. discrete bursts of serial bits, exchanged in a ping-pong protocol. In FIG. 3, illustration (b) the equipment matrix switch provides successive switch packets 56 to each telset and each telset responds with a return telset packet 58 (illustration (e)). The switch and all telsets each exchange one packet in each frame time interval ($T_{SP}$) 60, 61. This occurs constantly. If the telset is on-hook (idle) the switch packet may contain diagnostic or control information, and the station packet contains "silence".

The frame timing conforms with standard telephone voice and control signal bandwidths. The voice bandwidth is 4 KHz and the sampling frequency is 8 KHz, so that packet exchange occurs at an 8 KHz rate. FIG. 3, illustration (a) shows a packet 62 with ten bits, including: a START bit (S) 63, a control ORDER WIRE bit (O) 64, seven voice bits ($V_O$-$V_6$) 65, and one data bit ($D_O$) 68. The bit format is typically return-to-zero (RZ) with a 256 KBPS line rate to facilitate full duplex packet transmission over a single wire pair in each 8 KHz frame.

The voice and data bits 65, 66 represent PBX information. The START bit and ORDER WIRE bit are used for control/timing information exchanged between the switch and telsets. The ORDER WIRE bit is used for the various PBX control functions required to make the interconnect between telsets, e.g. for interconnect, dial up, dial tone, etc. It is the ORDER WIRE bit that is used in the present control system to exchange control information and sensed data between the central control in the PBX central equipment 20, and each secondary port control unit.

Referring again to FIG. 2, the ADM type PBX includes a port card I/O interface 54 having one or more I/O port cards for servicing the total number (N) of PBX signal ports. Each I/O port card receives the telset signal packets from a numbered group of signal ports at timed, one master clock (MCLK) intervals, as described in a copending application of common assignee herewith, entitled: PBX TELEPHONE SYSTEM REMOTE SYNCHRONIZATION, Flanagin et al, Ser. No. 432,884, filed on Oct. 5, 1982. The port serialized bit stream from each port card is provided on lines 68-72, collectively lines 74, to an N-to-one multiplexer (MUX) 76. Each sampled START (S) and ORDER WIRE (O) bits are stripped off before presentation to the MUX and presented through lines 77 to I/O control circuitry 78, which processes the ORDER WIRE information, as described hereinafter. The voice and data bits of the matrix switch packets are provided to the ports from demultiplexer (DMUX) 80, through lines 82 to port card return lines 84-88. The I/O control circuitry provides the ORDER WIRE (O) bits on lines 92, which are inserted into the matrix packets so they appear on lines 82.

The multiplexed port serialized bit stream is rearranged to format the serial bits into serialized, common port by time slot interchange (TSI) packets, formatter circuitry 94. The formatter circuitry provides the packets in parallel on lines 96 to a TSI matrix 98 which includes voice and/or data memories for momentarily storing and exchanging received packets from different telsets, all of which is well known in the art. The TSI matrix exchanges packets through time division multiplexing (TDM) in designated time slots, and retrieves the returning switch packet in similar fashion for presentation to each PBX signal port. Each TSI time slot is associated with one of the PBX signal ports. The return switch packets are presented through lines 100 in parallel to "TSI-to-port formatter" circuitry 102; the complement to the formatter circuitry 94, which converts the common port parallel bit format to the port serialized bit stream required for transmission through the I/O interface. DMUX 80 demultiplexes the return serial bit stream to the associated port card return line 84-88. A DMUX within each port card then reconstitutes the signal from each port into the common port serial bit packet required by the individual telsets.

The PBX central equipment includes a main PBX signal processor 104, which includes a known type CPU, such as the Zilog ® Z80 microprocessor. The processor includes a Dynamic Random Access Memory (DRAM) and a Programmable Read Only Memory (PROM) (not shown), all of which is well known in the art. The firmware resident in the PROM controls all processes in the PBX subsystems. In FIG. 2 the processor I/O is simplified to illustrate only the major I/O features; the main signal processor (MSP) interfacing through lines 23 with the attendant console 22 (FIG. 1), through lines 106 with an additional data base random access memory (RAM) 108, and through lines 110 with the I/O control circuit 78. The control system software and data storage is maintained in the data base RAM 108.

I/O control circuitry 78 provides PBX timing (MCLK) and control of the matrix and I/O signal ports. The I/O control includes a local signal processor (LSP) 112, also of a known type such as the Z80 with DRAM and PROM memories. The LSP 112 communicates with the MCP 104 through full duplex RS232 and UART interfaces 114, 116; the LSP communicates with the PBX matrix switch 98 and the remaining PBX central equipment through bus interface 118, lines 120, and data bus 124. The LSP is under real time control of the MCP and accepts command inputs for execution of all PBX and control system functions: to make voice and data connections, transmit and receive ORDER WIRE (O) control bits for PBX and control system commands and data transport, to connect the I/O signal ports to steady and/or timed dial tones, to establish signal port synchronization of telset station packets, and to perform signal port diagnostics. The I/O control master clock (MCLK) 126 provides all subinterval time and framing signals. The timing circuitry includes an oscillator (not shown) which establishes the MCLK frequency (the ADM frame time interval) and divide-by counters which mark lower frequency subintervals, such as an ORDER WIRE superframe interval discussed hereinafter. The clock signals are provided through lines 128 to each I/O port card, to the MUX 76 and MUX 80, and through lines 130 together with the data lines 122 from the bus 124, to the TSI matrix through common conduit 132.

The PBX primary port telsets are microprocessor based machines controlled by the PBX main signal processor 104 by control messages formed from the ORDER WIRE (O) bit. The control messages are one or more bytes each. With one ORDER WIRE bit transmitted in each packet (both switch and telset) each control message byte must be transmitted on eight successive packets, and each must be preceeded by an ORDER WIRE START bit (OS). This requires nine bits, so that a control byte requires nine PBX frames. In the present PBX an ORDER WIRE superframe is provided, which is a series of sixteen 8 KHz PBX frames, with an interval time of two milliseconds. The interval is marked by the OS bit, giving an ORDER WIRE bandwidth of 500 bytes per second.

The ORDER WIRE bits received by the I/O control circuitry on line 77 are presented to ORDER WIRE byte converter 134, which detects the bit-by-bit control messages from each port as they appear in real time following the OS bit. A random access memory (not shown) in the byte converter stores the eight bit control byte as received from each port I/O; the eight bits are stored as they appear on the incoming lines, scrambled with those of other ports. Complete bytes are then descrambled by selective addressing of the RAM and tagged with a multiple bit port address. The combined control byte and port address is then written from the converter into a first-in-first-out (FIFO) register 136. The local signal processor (LSP) 112 polls the FIFO register periodically and reads the identified bytes sequentially via the bus 124.

Control messages from the PBX I/O control to the telsets are formed in an ORDER WIRE (OW) transmitter 138, which is loaded by the LSP on command of the main signal processor 104. The OW transmitter timing is provided by the clock 126 and the transmitter is synchronized by the superframe mark to the port card I/O interface. The transmitter includes an OW START BIT (OS) RAM (not shown) which includes a START flag bit for each of the PBX ports. The transmitter also includes a second ORDER WIRE character RAM containing one byte of control message space for each port in the PBX system. In operation, the transmitter completes one operational cycle in each superframe. One of the sixteen frames is used to read the OS bit RAM. The main signal processor 104 then uses the following six frames to load the OW CHARACTER RAM with the bytes it wishes to send to the various ports. During the remaining nine frames of the superframe the OW transmitter, driven by the matrix switch state counter (not shown) places the control messages on the output lines 92 where they are stuffed into the serialized bit stream on the lines 82 to the port card I/O interface.

FIG. 3, illustration (b) shows a PBX superframe 140 as including sixteen information frames. The first nine information frames 142-150 include the ORDER WIRE START bit (142) and control bits 143-150. Illustration (e) shows the ORDER WIRE response from the telset, transmitted packet-by-packet with the switch packets within common frame intervals, such that the return ORDER WIRE transmission from the telset also occurs in the first nine bits 152-160 of superframe 140. This ORDER WIRE transmission format which the PBX system uses to provide control and command information to each of the primary port telephones, or telsets, is used in the present control system to provide the necessary control information to the secondary port control units, and to return the sensed status/data information from each secondary port control unit back to the PBX MSP 104. In this case the telephone "passes through" the PBX transmissions to the control unit together with return transmissions from each. The pass through, however, is not in real time and is not in the same protocol used for ORDER WIRE transmission between the primary port device and the PBX. Instead, each telephone collects the individual ORDER WIRE bits transmitted in each direction to first form complete bytes, and then converts the RZ primary port format to a bipolar (tri-state) format for transmission between the telephone and control unit, all of which is described in detail hereinafter.

In the present invention all of the secondary port control units are microprocessor based devices, each capable of providing local control of apparatus within proximity of the installed telset. The controlled apparatus may vary in function. They may include process machines used in manufacturing, whereby production line monitoring and process control may be supervised from a central location. Similarly the controlled apparatus may be energy management devices for controlling local environment, such as heating, ventilating and air conditioning (HVAC) equipment which, from the standpoint of energy conservation, may be more efficiently controlled from a central location. In all applications the control unit is an intelligent unit capable of full authority control over the selected devices; the central control providing supervisory authority and allowing for discretionary changes in set point limits or control processes.

Figure 4:
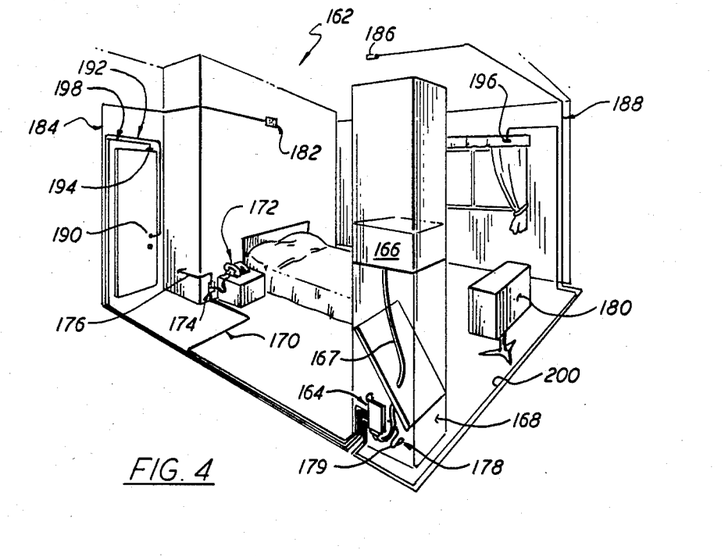
FIG. 4 is a perspective illustration of one application of the control system of the present invention.

One application of the control unit is for energy management and comfort control of guest rooms in a multiple unit occupancy, such as a hotel, or motel. The energy management (EM) control unit allows for local control over HVAC equipment by the room occupant within limits established by the central control. In addition, the EM unit may itself regulate to different comfort levels depending on whether or not the room is presently guest registered or it if is presently occupied by the registrant. In addition to HVAC control other guest comfort features such as television (TV) remote control and guest safety conditions, such as smoke detection and intrusion alarms may also be monitored and flagged to the central control station. FIG. 4 is a perspective illustration of the secondary port EM control installed in a hotel or motel guest room 162. The control unit 164 is located within the room located adjacent to the HVAC equipment, typically an "HVAC Fan Coil Unit" of the type used in hotel guest rooms. The control unit is connected to the HVAC coil relay box 166 through lines 167. The relay box actuates the HVAC fan coil unit 168. The secondary port EM control is connected through wire pair 170 to the primary port telset 172 via a standard six conductor wall jack 174; the jack also connects the standard two-wire pair conductor 176 from the PBX central to the telset; the wall jack providing a convenient terminal connect for the three wire pairs running to the telephone. The EM unit senses room temperature through temperature probe 178 and line 179, to control the on/off actuation of HVAC heating and cooling coils and the HVAC fan, as described hereinafter. Remote control of the room television 180 is by remote infrared (IR) transmitter 182 connected through wire pair 184 to the control unit. The EM unit also monitors various safety and room status conditions, such as smoke detection through detector 186 connected through wire pair 188, the entry door deadbolt lock setting through sensor 190 and wire pair 192, and open/closed sensors placed on the door 194 and window 196 (or sliding doors) and connected through lines 198 and 200.

Figures 5, 9:
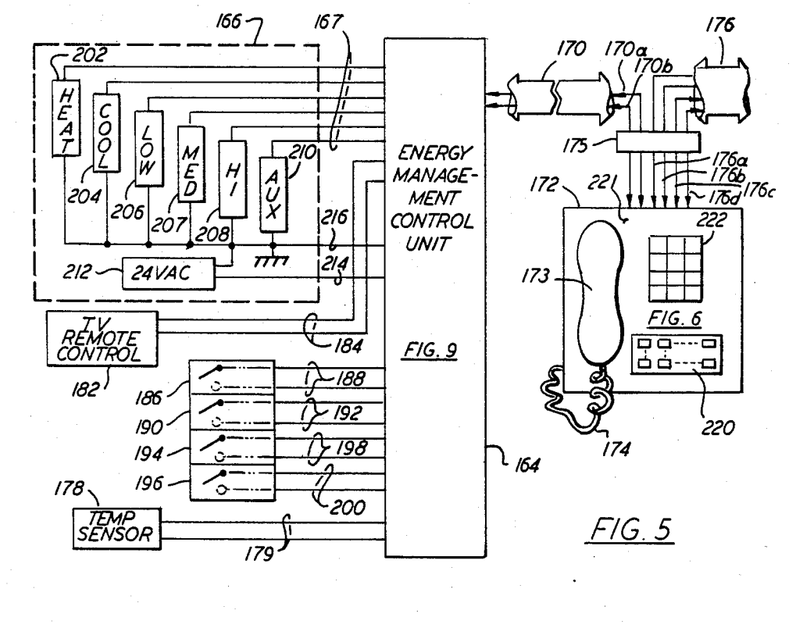
FIG. 5 is a system block diagram of the remote control system embodiment for the application of FIG. 4.
FIG. 9 is a schematic illustration of the remote control unit used in the embodiment of FIG. 5.

FIG. 5 is a system block diagram of the interconnections between the control unit 164, the telephone 172, and each of the controlled devices illustrated in FIG. 4. The EM control unit is a low voltage device; it does not energize the HVAC heating and cooling coils, or fan, directly, but activates a set of six relays mounted in the HVAC fan coil relay box 166. These include heating and cooling coil relays 202, 204, fan speed relays (low, medium, high) 206–208, and auxiliary relay 210. The EM control provides a 24 VDC 200 MA output to each relay coil on lines 167. The control unit provides these outputs from input power received from a 24 VAC power supply 212 in the HVAC equipment; connected through lines 214 (high side) and 216 (signal ground).

The four input sensors (smoke detector 186, dead-bolt sensor 190, and door and window sensors 194, 196) are discrete (ON/OFF) sensing devices which provide an interrupt to the EM unit to signal an alarm condition, as described hereinafter with respect to FIG. 7. The interconnect between the EM unit and the telephone 172 is through the wire pair conductors 170$_a$, 170$_b$ and the four wire interconnect from the PBX is through conductors 176$_a$, 176$_b$. EM control over the television channel select and volume is by discrete command; the control unit is provided with guest requests through keypad 220 mounted on the face 221 of the telset adjacent the numeric pad 222. The form and function of the keypad is discussed with respect to FIG. 13.

Figure 6:
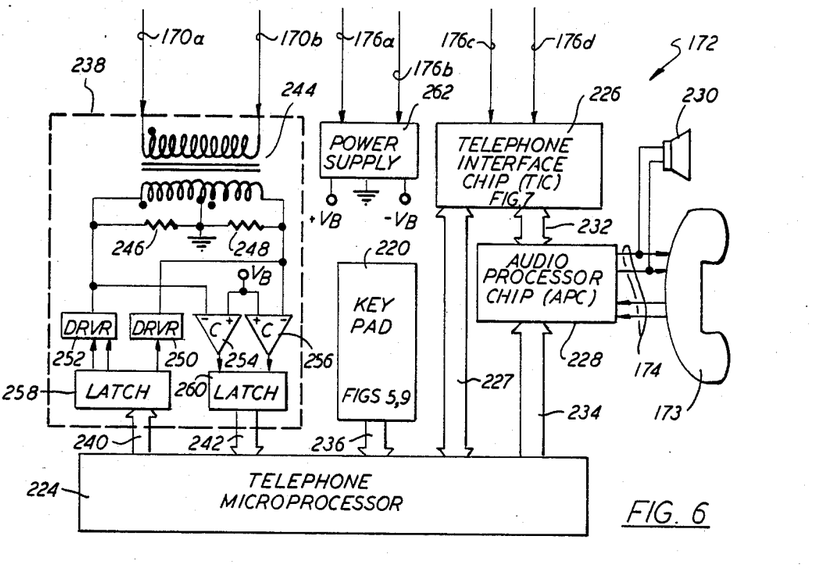
FIG. 6 is a schematic diagram of a primary port telset used in the control system of FIG. 1.

FIG. 6 is a system block diagram of the telset 172 with microprocessor 224, having a known type CPU with resident RAM and ROM memory. The telset includes a telephone interface chip (TIC) 226 which interfaces with audio and data lines 176$_c$, 176$_d$ of the two wire pair 176 from the PBX central equipment. The TIC provides line signal conditioning and impedance matching together with telephone control and timing circuitry, including the ORDER WIRE control interface described in FIG. 7. Audio signal processing is provided by audio processor chip (APC) 228 which receives and transmits all audio to the handset 173 and optional built-in speaker 230, through lines 174. The APC connects to the TIC through lines 232 and to the processor through lines 234. The processor also interfaces with the keypad 220 through lines 236, and an EM control I/O interface 238 through I/O lines 240, 242.

The EM I/O includes an isolated (isolation transformer 244) balanced pair input (resistors 246, 248 connected across each secondary winding to ground). Each secondary winding is connected to one of a pair of line drives 250, 252 and line receivers 254, 256. The drivers and receivers each include associated latching registers 258, 260. The drivers provide drive current for the ORDER WIRE control bit outputs provided by the telset microprocessor through lines 240; the line receivers provide threshold detection of the received ORDER WIRE bit transmissions from the EM unit which are presented through lines 242 to the microprocessor. Power supply 262 receives the input power from the PBX on lines 176$_a$, 176$_b$ and provides local regulated DC outputs $(+V_B, -V_B)$.

Figure 7:
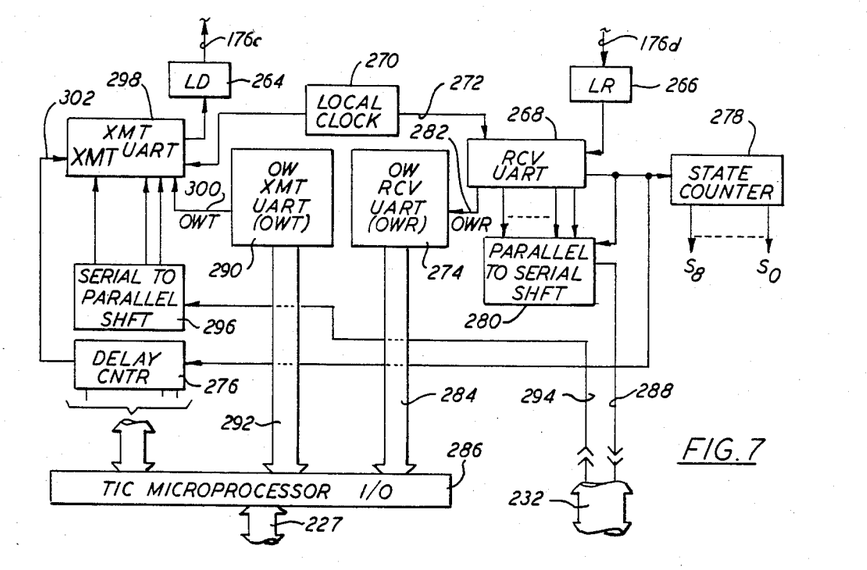
FIG. 7 is a schematic diagram of one component of the primary port telset of FIG. 6.

PBX ORDER WIRE transmissions are received in the TIC through the line driver, line receive circuits 264, 266 of FIG. 7. The line receiver sharpens up the received PBX switch packet bits for a receive UART interface 268. The UART is queued by a XMT/REC gate signal from local clock 270 on line 272, which is synched to the PBX MCLK on each received packet. When queued the UART detects the switch packet START bit and establishes a fixed interval sampling for the succeeding nine bits. Following the packet tenth bit the UART 268 provides a strobe signal to ORDER WIRE received UART 274, to delay counter 276, and to state counter 278. Since the strobe is fixed to time of arrival (TOA) of the switch packet, which is fixed to MCLK, the strobe is used to reset the telset local clock on every frame, and to initiate a delay countdown by counter 276, to clock out the interval delay prior to transmission of the telset return packet. The state counter 278 maintains the I/O state count for processing of the signal packets.

The received voice and data bits are loaded in parallel to a parallel-to-serial shift register 280; the ORDER WIRE received bits (OWR) are stripped and presented on line 282 to an OW receive UART 274, where they are byte collected and transferred through lines 284, TIC I/O 286, and lines 227 to the telset processor 224 (FIG. 6). Register 280 shifts the received voice and data bit serially through line 288 of conduit 232 to the APC. Similarly, on the output side an ORDER WIRE transmit (OWT) UART 290 receives ORDER WIRE bytes on lines 292 from the telset processor for transmittal to the PBX central. The voice and data bits are formulated in the APC and serially loaded through lines 294 into a serial-to-parallel register 296, which loads the telephone packet in parallel to a transmit UART 289; the telephone ORDER WIRE bit is loaded from UART 290 through line 300 (OWT) to the UART 298. At the end of the counter 276 delay time a XMT gate signal on line 302 enables the UART 298 which transmits the packet through driver 264 to PBX central.

Figure 8:
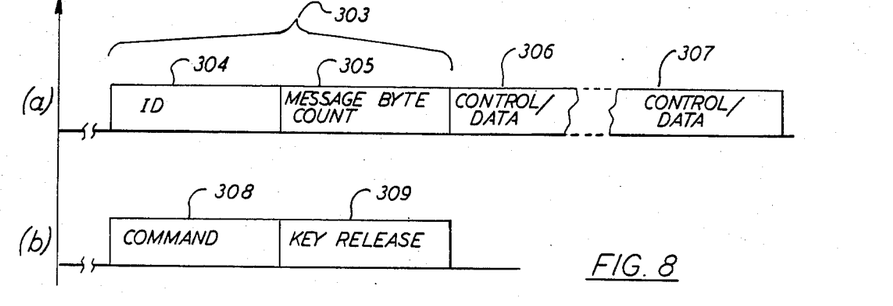
FIG. 8 is an illustration of another set of waveforms used in a description of the system of FIG. 1.
Figure 9:
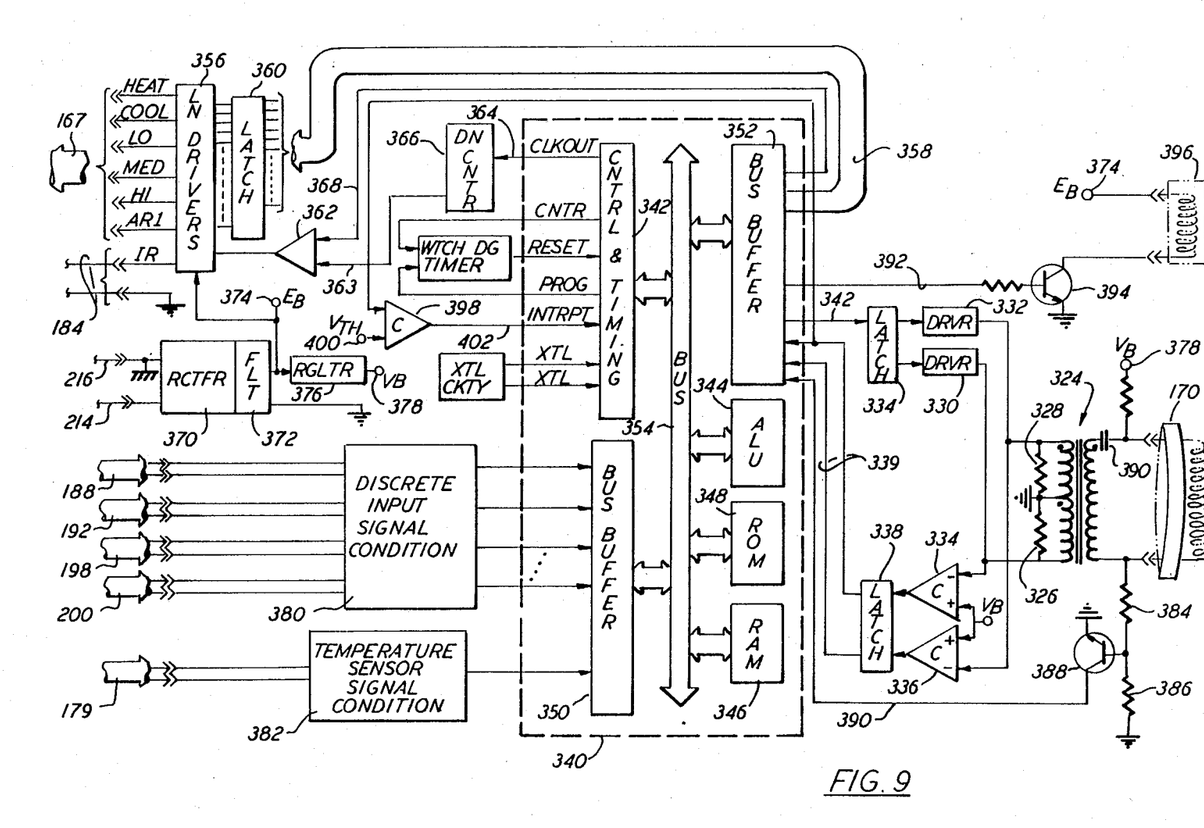

The telset T/C receives and transmits all ORDER WIRE information from and to the PBX central, including that between the PBX and the secondary port control units. For control unit ORDER WIRE information the T/C first collects complete bytes, i.e. one superframe. Each complete byte is then passed on to the control unit. To allow the telset to distinguish between ORDER WIRE transmissions intended for it and that to be passed through to the EM unit, a special two bype header is used on all "pass through" transmissions, as shown in FIG. 8, illustration (a). The two byte header 303 includes a first byte identification (ID) 304 which identifies the secondary port control unit as the recipient of an ORDER WIRE message from the PBX. The header's second byte 305 identifies the number of bytes 306–307 in the message. This allows instant telset recognition of pass through transmissions. All of the telset originated keypad commands to the secondary port unit are single byte commands 308, followed by a key release byte indicator 309 (FIG. 8, illustration (b)); transmitted without a header. As described hereinafter, the key pad commands are mapped in the EM processor memory with a unique HEX nmemonic address. This address in addition to the lack of the ID byte causes the keypad commands to be instantly recognizable by the control unit as command from the telset rather than the PBX.

The telset microprocessor passes the ORDER WIRE bytes to the control unit at the 500 bytes per second PBX ORDER WIRE baud rate; one byte every two milliseconds. The pass through transmission is in tri-state form at 20 KBPS line rate (2500 bytes per second). It does this in redundant transmissions. Each byte is transmitted twice, in succession, to the control unit, i.e. duplicate. FIG. 3, illustration (c) shows a telset to control unit transmission. The first nine ORDER WIRE bytes 142-150 (illustration (b)) of superframe 140 are packed into a bipolar nine bit byte 310 with start bit 312 and eight ORDER WIRE bits 313, transmitted twice. Following TOA 314 at the secondary port control unit, the unit sends back an ACKNOWLEDGE (ACK) to the telset in a selected window interval 360. The acknowledge may consist of four bits transmitted within a 200 microsecond interval; the telset must receive at least three bits for an ACK, otherwise it retransmits the bytes in duplicate. The same duplicate byte transmission occurs between the secondary port control unit and the telset as shown by the tri-state redundant byte transmission with START bit 318 and duplicate information bytes 320.

Referring now to FIG. 9, in a system block diagram of the EM control unit the wire pair 170 from the telset is received at the primary of isolation transformer 324 of an EM I/O interface identical to that (238, FIG. 6) in the telset. The balance resistors 326, 328 are connected across the secondary windings to ground. The secondary windings are each connected to an associated one of a pair of line drivers 330, 332 and line receivers 334, 336, in a differential I/O. The receiver output is buffered in latching circuitry 338 prior to presentation through lines 339 to the control unit signal processor 340. Similarly the output from the EM processor is provided on line 342 to latching circuitry 344 and drivers 330.

The EM control unit signal processor 340 is of a known type, such as the NEC Microcomputers Inc. Model μPD8049 eight bit microcomputer. In the simplified block diagram, the signal processor is shown as including: control and timing circuitry 342, arithmetic logic unit (ALU) 344, RAM 346 and ROM 348 memories, bus buffers 350, 352 and data bus 354. Typically, the RAM and ROM memories include 128 and 2K byte capacities.

The EM output drive signals to the HVAC heating and cooling relays (Heat, Cool), fan speed relays (LO, MED, HI) and auxiliary coil relay (AR 1) on lines 167 and the infrared (IR) TV remote control signal on lines 184, are all provided from line driver circuitry 356. The driver HVAC input signals are provided from the processor 340 on lines 358, through latch 360. The driver provides a typical 24 VDC, 200 ma drive signal equivalent. The IR signal is presented to the line driver through comparator 362 as a modulated 40 KHz square wave. The 40 KHz square wave carrier is provided on line 363 by down counting a 400 KHz clock output 364 from the processor in down counter 366. The modulation pattern is determined by the modulating bit pattern provided on lines 368 from the processor, and determines the TV parameter to be controlled (e.g. on/off, volume up/down, channel select up/down) in accordance with the patterns specified by the remote control unit manufacturer.

The EM unit receives input power from the HVAC fan coil unit on lines 214 and 216 (ground). Rectifier 370 and filter 372 provide the EM unit unregulated DC source ($E_B$) 374 used by line driver 356. Voltage regulator 376 provides a regulated DC source output 378 for EM internal circuitry.

The four discrete sensors on lines 188, 192, 198, and 200 are presented through signal conditioning circuitry 380 to different input ports of the processors buffer 350. Similarly, the sensed temperature input on line 179 is provided through temperature sensor signal conditioning circuitry 382 to another input port of the buffer. The signal conditioning filters the discrete input signals and provides any signal state changes required to make the input signals processor compatible. The temperature sensor signal conditioning converts the sensed temperature signal into a processor compatible signal equivalent.

An optional feature of the EM unit is a "theft alarm" for the primary port telset. The telset, interconnected to the wall plate, is easily removed. To discourage unauthorized removal the EM unit includes audible alarm circuitry. The primary of transformer 340 is connected to the source voltage $V_B$ 378 at one input and through resistors 384, 386 to the base input of a gated switch 388 at the other input. The switch is shown as an NPN transistor, with emitter connected to signal ground and collector connected to a port of the processor buffer 352. Capacitor 390 connected in series with the primary winding of transformer 324 blocks the $V_B$ DC signal current from passing through the primary winding. Instead the bias current path is provided through interconnecting lines 170 and the primary winding of the telset IO transformer 244 (FIG. 6). The completed current path provides base drive for transistor 388 which clamps the input port to the signal processor. Telset removal interrupts the bias current path, transistor 388 turns off and the line 390 port input goes high. In response the processor provides a gate signal through buffer 352 and line 392 to the transistor 394 which energizes the coil 396 of an optional audio alarm, and reports the alarm to the central station control.

The EM unit processor 340 operates on an interrupt basis in response to input transmissions from the primary port telset. Comparator 398 responds to signal inputs on lines 339 greater than a threshold ($V_{TH}$) voltage to provide the input interrupt 402 to the processor. The interrupt is provided on detection of the ORDER WIRE START BIT (312, FIG. 3, illustration (c)).

The present control system is a table driven subsystem of the PBX in which each event associated with the secondary port control units are mapped into one or more "transactions". Each transaction is comprised of some number of "configurable actions" which represent the smallest building block of the table driven control system. The configurable actions are grouped together in tables stored in the PBX data memory (108, FIG. 2) in different patterns to form different transactions. For example, the EM control unit sensed inputs (door, window open/closed, etc. have two states. Each sensor is associated with two transactions which are used to handle transition from one state to another. By providing a table driven format the glossary of transactions and configurable actions may be changed, modified, or added to provide additional event response, or to customize the control unit operation to specific user requirements.

Table I is an exemplary list of transactions used in the EM type control unit for HVAC and TV guest control. Table II is the associated list of configurable actions, one or more of which may be grouped together to form the transaction of Table I. Appendix A hereto lists for each of the transactions of Table I the corresponding number of Table II actions associated therewith. It should be understood, however, that both Tables I, II and Appendix A are illustrative of one embodiment of the EM type of control unit. That various other transaction and configurable action lists would be required for a different type of remote control functions.

TABLE I

| Transaction No. | Transaction List Description |
|---|---|
| 0 | Do nothing |
| 1 | New temp. is requested |
| 2 | New fan speed is requested |
| 3 | Fan off is requested |
| 4 | Temp. goes up |
| 5 | Temp. goes down |
| 6 | EM needs to be initialized |
| 7 | Smoke alarm is on |
| 8 | Smoke alarm is off |
| 9 | Deadbolt locked |
| 10 | Deadbolt unlocked |
| 11 | Door open |
| 12 | Door closed |
| 13 | Window open |
| 14 | Window closed |
| 15 | Check in |
| 16 | Check out |
| 17 | Set EM inactive in room |
| 18 | EM start-up |
| 19 | Set EM active |
| 20 | Set room to occupied state |
| 21 | Set room to unoccupied state |
| 22 | Log sensor goes high |
| 23 | Log sensor goes low |

TABLE II

| Action No. | Action List Description |
|---|---|
| 0 | No Op |
| 4 | Set SPD Broadcast Mode for TV keys & Load Key depression parameters |
| 8 | Set Registered Info in ROOM STATUS |
| 12 | Reset Registered Info in ROOM STATUS |
| 16 | Set Inactive Info in ROOM STATUS |
| 20 | Reset Inactive Info in ROOM STATUS |
| 24 | Set Occupied Info in ROOM STATUS |
| 28 | Reset Occupied Info in ROOM STATUS |
| 32 | Set DESIRED TEMP to default |
| 36 | Determine of new DESIRED TEMP. |
| 40 | Set new DESIRED TEMP (in Database) |
| 44 | Calculate new Limit Temp |
| 43 | Set states of Hotter/Cooler Lamps |
| 52 | Set new ACTUAL TEMP (in database) |
| 56 | Set FANS STATUS to default |
| 60 | Set new FAN SPEED in Database |
| 64 | Send Limit Temp. to EM-3 |
| 68 | Send new fan speed to EM-3 |
| 72 | Send HVAC duration, FIC/FFC to EM-3 |
| 76 | Send "quick-control command" to EM-3 |
| 80 | Alert LX-MC |
| 84 | Inform FOBO |
| 88 | Turn on Door Unlocked lite |
| 92 | Turn off Door Unlocked lite |

All of which, however, may be table driven so as to permit flexible programming. The central station console receives all sensed input data from the EM unit, and provides necessary EM control set point information. In other words, the central station performs the executive routines of constantly monitoring and supervising the secondary port control unit operations. For the HVAC control procedures performed by the EM unit this includes central monitoring of the operator's (guest) inputs to the EM through the telset key pad, changes in EM sensor inputs (discrete inputs plus sensed temperature changes) and storing all of this information in a data base within the PBX (data RAM 108, FIG. 2). The central control supervisory functions are outlined in the executive routine performed by the central, as illustrated in the flowcharts of FIGS. 10, 11.

Figure 10:
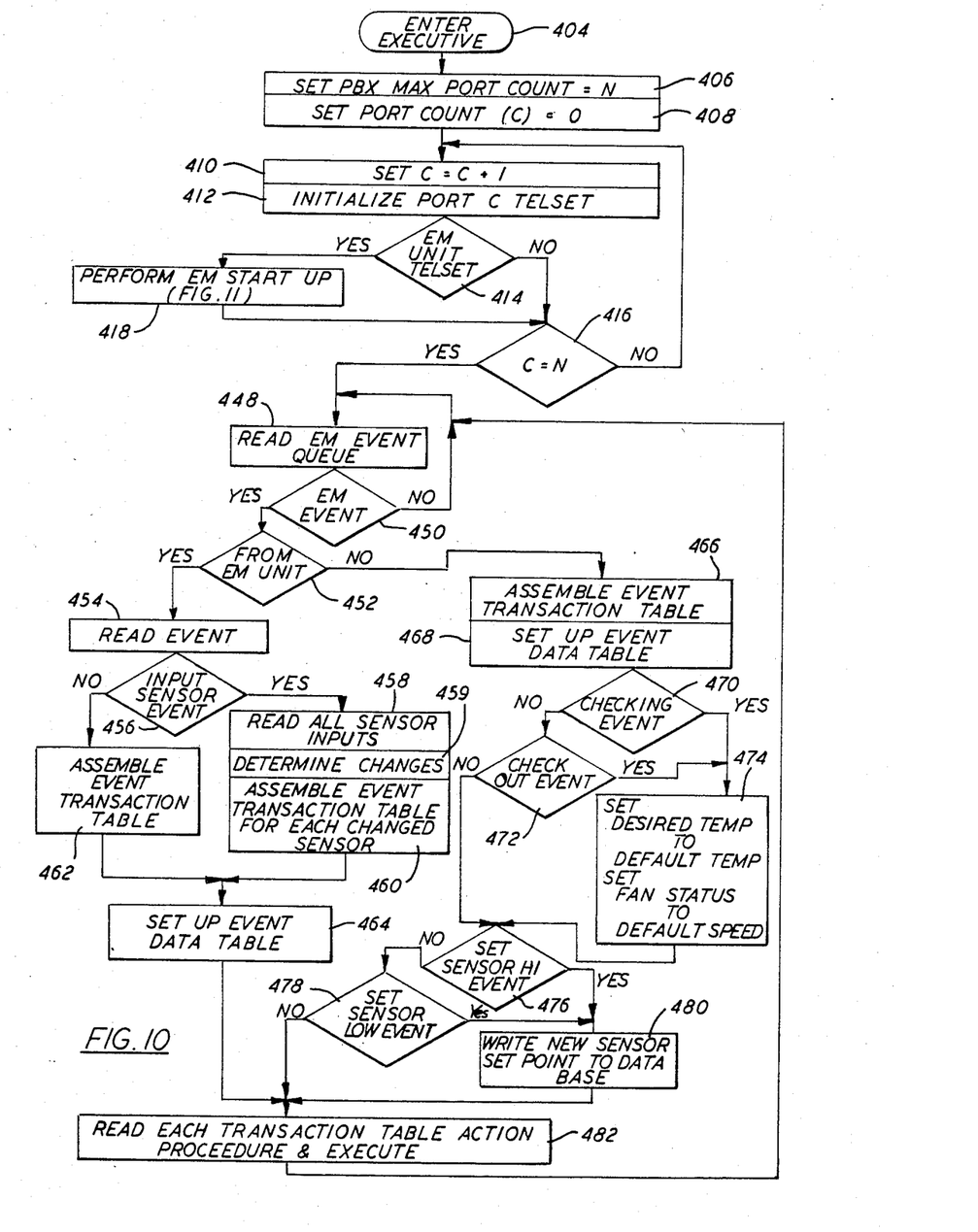
FIG. 10 is a flowchart diagram illustrating the control function of the system of FIG. 1.
Figure 11:
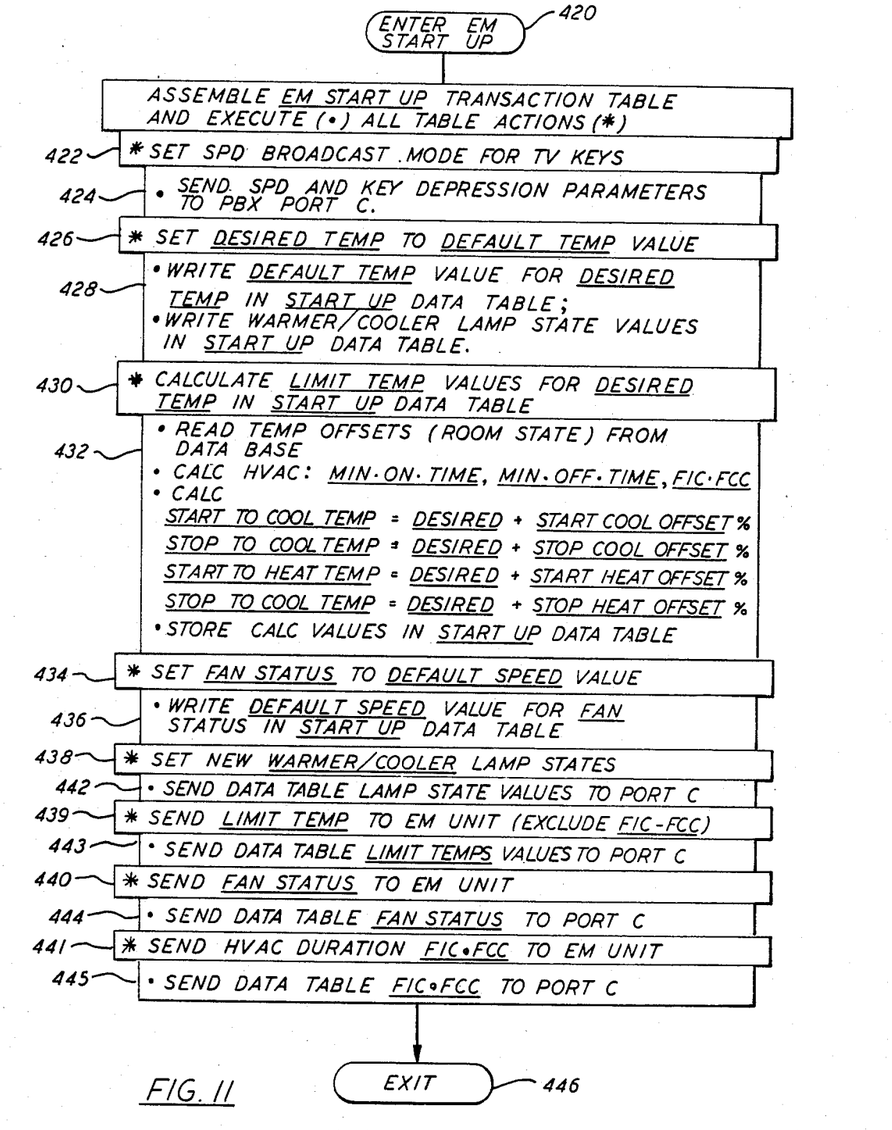
FIG. 11 is another flowchart diagram detailing one aspect of the flowchart of FIG. 12.

Referring to FIG. 10, the PBX signal processor 104, FIG. 2) provides executive supervision of the secondary port control units operation. The PBX processor enters the executive program at 404 and provides initial set up conditions by determining the maximum number of PBX signal ports (N) in instructions 406, and in instructions 408 setting a port state count (C) to zero. The routine first requires initialization of all the primary port telsets and the secondary port control units. Instructions 410 begin by incrementing the port count to the first port and initializing the port c telset in instructions 412; the telset initialization procedures being those deemed necessary for the particular type of PBX system, as known to those skilled in the art. The primary port device initialization procedures involve synchronization of the telset packet transmissions to the PBX. This is an interactive process, as described in a copending application of common assignee herewith, entitled: PBX TELEPHONE SYSTEM REMOTE SYNCHRONIZATION, Flanagin et al, Ser. No. 432,884, filed on Oct. 5, 1982. Following the primary port device initialization decision 414 determines if the initialized primary port device includes an associated secondary port control unit, such as the EM unit. If NO, decision 416 next determines if count C=N. If NO, the routine branches back to instructions 410 for initialization of the next port. If decision 414 is YES, the processor performs initialization of the secondary port control unit in instructions 418. For the EM control unit the START UP procedure is illustrated in the FIG. 11 flowchart.

Figure 12:
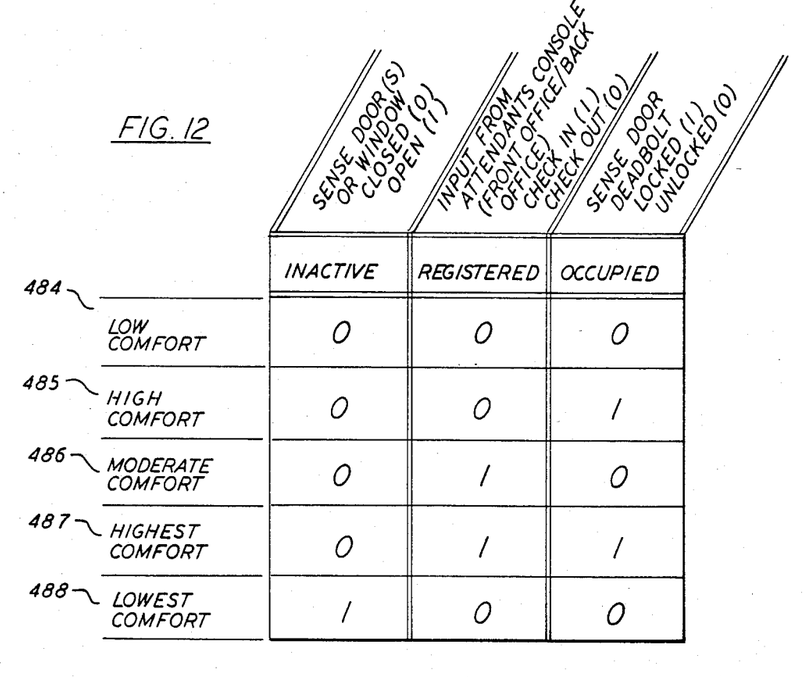
FIG. 12 is a tabular illustration of one feature of the embodiment of FIG. 5.

The PBX signal processor enters the EM START UP routine at 420 and assembles the EM START UP transaction table; START UP being one transaction having a number of configurable actions. The routine then executes the procedures (.) for all of the table listed actions (*). Action 422 requires setting of the SPD broadcast mode for the various TV keys which blocks certain selected keypad information e.g., TV control, from being sent back to the PBX data base. This is optional and the keypads screened by the broadcast mode are alterable. The procedure 424 for action 422 requires sending the SPD broadcast parameters to PBX port C for transmission to the port telset and associated secondary port control unit. Action 426 sets the DESIRED TEMP (control temperature) to a DEFAULT TEMP value. The desired temperature is a temperature band, having a given temperature bandwidth between selected high temperature and low temperature set points. The default temperature bandwidth is one of five selectable control temperature bands provided by the EM control unit. The particular DEFAULT TEMP value for the given zone is set by the PBX signal processor based on the zone's prior history, as recorded in the PBX data memory. The default temperature value is also alterable. The procedures 428 for this action requires writing the DEFAULT TEMP value for the DESIRED TEMP in the START UP data table. Each event includes its own data table. Also the warmer/- cooler lamp states, i.e. the keys are illuminated in response to warmer and cooler commands set by the guest, are written into the START UP data table.

Action 430 requires calculation of the LIMIT TEMP value for the DESIRED TEMP listed in the START UP data table. These LIMIT TEMP values include the START and STOP HVAC heating and cooling temperatures associated with each of the high and low temperature set points. Each set point includes a temperature hysteresis band with start and stop values. Procedures 432 perform this action by reading the temperature offsets associated with the present one of five room comfort levels discussed hereinafter with respect to FIG. 12. With the DESIRED TEMP and the OFFSETS known from the data table the four start and stop temperature values are calculated. In addition, the MIN ON TIME and MIN OFF TIME for the HVAC fan, and the HVAC heating or cooling duration (FIC/FFC) are read from PBX memory. The fan and HVAC heating and cooling cycle times are dependent on the particular comfort level selected. Next, action 434 requires the FAN STATUS to be set to the DEFAULT SPEED. This is accomplished in procedures 436 where the default speed is written for the fan status and the START UP data table. The default speed is a base HVAC fan speed, which may be alterable. The remaining four actions 438-441 require the calculated START UP data to be sent to the EM unit and procedures 442-445 read the related data from the START UP data table and transmit them to the PBX port c. All data transmitted to the port is by ORDER WIRE BIT. The processor exists the START UP routine at 446.

Referring again to FIG. 10, if in decision 416 C=N the initialization procedure for both primary port telsets and secondary port control units is complete. The control system then begins the control function with instructions 448 by reading the EM EVENT QUEUE. This event queue is the buffered interrupt input to the PBX processor which lists all events associated with the EM control; those originating in the EM control unit, the telset keypad, or the attendant's console. In the hotel/motel application the control system is adapted to interact with an automated hotel/motel reservation system, i.e. a separate processor based data management system referred to as a Property Management System (PMS). With the PMS guest transactions are automatically entered into the system. Certain of these transactions, such as guest registration (check-in, check-out) are EM associated events which affect room comfort setting and which are automatically read into the EM EVENT QUEUE.

Decision 450 determines if an event is present in queue. If NO, the processor branches back to 448; if YES decision 452 determines if the event is from the EM control unit itself. If YES, instructions 454 read the event and decision 456 determines if the event is associated with a change in EM input sensor states. If YES, instructions 458-460: read all sensor inputs, tabulate those changed sensor inputs, and assemble an event transaction table of configurable actions for each changed sensor. If the decision 456 is NO, instructions 462 assemble an event transaction table for the particular event. Following instructions 460, 462, instructions 464 set up the event data table, listing the event control set points; depending on the configurable actions associated with each assembled transaction table, in a similar manner to that illustrated for the EM START UP procedure 418 illustrated in FIG. 11.

If the result of decision 452 is NO, i.e. the event is not from the EM control unit itself, instructions 466 assemble the particular event transaction table and instructions 468 set up the associated event data table. Next, decisions 470, 472 determine if the event is and FOBO event related to registration, i.e. whether or not the room is registered for use. Decision 470 determines if the event is a "check in". If NO, decision 472 determines if the event is a "check out". If the answer to either is YES instructions 474 set the DESIRED TEMP and FAN STATUS to the DEFAULT TEMP and DEFAULT SPEED values. Following instructions 474, or a NO to decision 472, decisions 476, 478 determine if the event is a resetting of one of the sensor set point values. If YES, instructions 480 request that the new sensor set point state be written to the control system data base in PBX memory 108 (FIG. 2). Following either instructions 464, 480, or a NO to decision 478, instructions 482 request execution of each of the configurable action procedures associated with the mapped transaction, after which the processor branches back to instructions 448 to read the next queued event.

Figure 13:
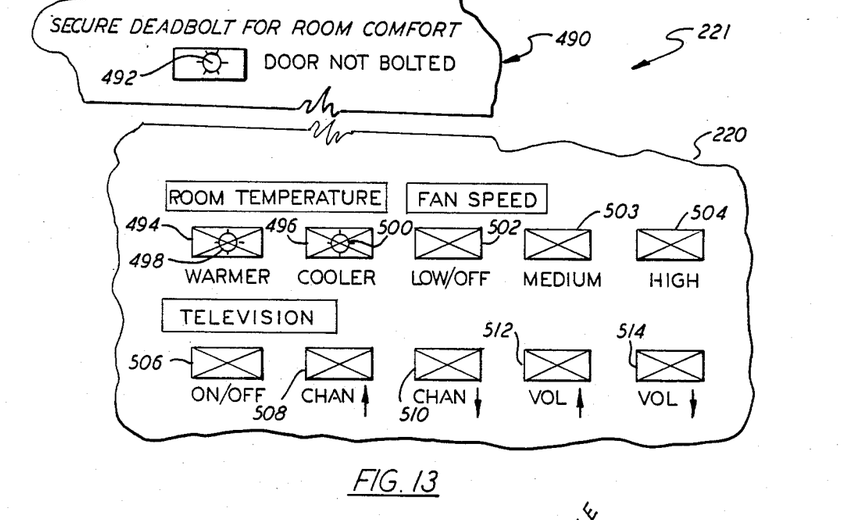
FIG. 13 is an illustrated diagram showing one component used in the embodiment of FIG. 5.

As indicated, there are a selected number of comfort levels associated with the EM control of HVAC operation of the controlled space environment. These levels are selectable and may include more than one; five is considered optimal. FIG. 13 is a tabulation of the five levels 484-488 listed in the left-hand column. Each comfort level is associated with a unique combination of state values for three selected status parameters for the controlled space (room). These include an INACTIVE, a REGISTERED, and an OCCUPIED state. Each state parameter is controlled by an EM event. The INACTIVE status is set (1) when the EM control unit senses an open door(s) or window associated with the control space, and is reset (0) when all doors and windows are closed. The setting (1) of the INACTIVE status provides the lowest comfort level (widest set point temperature band) notwithstanding the status of any of the remaining two of the room status parameters. In other words, if the room door or window is open, the lowest comfort level is selected in all cases.

The REGISTER status is determined by inputs from the attendant's console, or PMS. The REGISTERED STATE is set (1) in response to a guest check in and reset (0) in response to guest check out. In the present embodiment, the OCCUPIED status is determined by the setting of the entry door deadbolt, however, any one of the other sensor inputs may be configured to provide sensed room occupancy. The guest is on notice that room comfort levels are dependent on the setting of the deadbolt, such that the OCCUPIED status is set (1) when the sensed deadbolt setting is locked, and reset (0) when the deadbolt is unlocked. As shown, the highest comfort level is associated with an occupied registered room status; the lowest with an INACTIVE status, and the remaining three states being intermediate with either high, low, or moderate comfort levels, as assigned.

As stated hereinbefore the occupant interface with the control system is via the keypad 220 located on the face 221 of the telset 172 (FIG. 5). FIG. 13 is a detailed illustration of certain features of the telset face including keypad 220 and an anunciator display 490 of the deadbolt sensor setting, with lamp 492. The keypad includes five keys associated with HVAC control. These include the WARMER and COOLER keys 494, 496. These keys are back lighted with lamps 498, 500, which are turned on by the PBX main processor (through ORDER WIRE control bus) in response to the sensed depression of the keys; a request for a change in temperature by the room occupant. The key lamp remains lighted for the time interval required for the sensed room temperature (sensor 178, FIGS. 4, 5) to equal the changed room temperature set point at which time the key lamp is turned off. There are three fan speed keys 502–504 associated with LOW/OFF, MEDIUM, and HIGH fan speeds. There are also five television keys including ON/OFF 506, CHANNEL INCREASE 508, CHANNEL DECREASE 510, VOLUME INCREASE 512, and VOLUME DECREASE 514. Depression of any of the keys results in a single byte command presented to the telset to the EM control unit, in the form described hereinbefore with respect to FIG. 8, illustration (b). Each key command represents one byte of information and the release of each key generates a second key release byte character.

Figure 14:
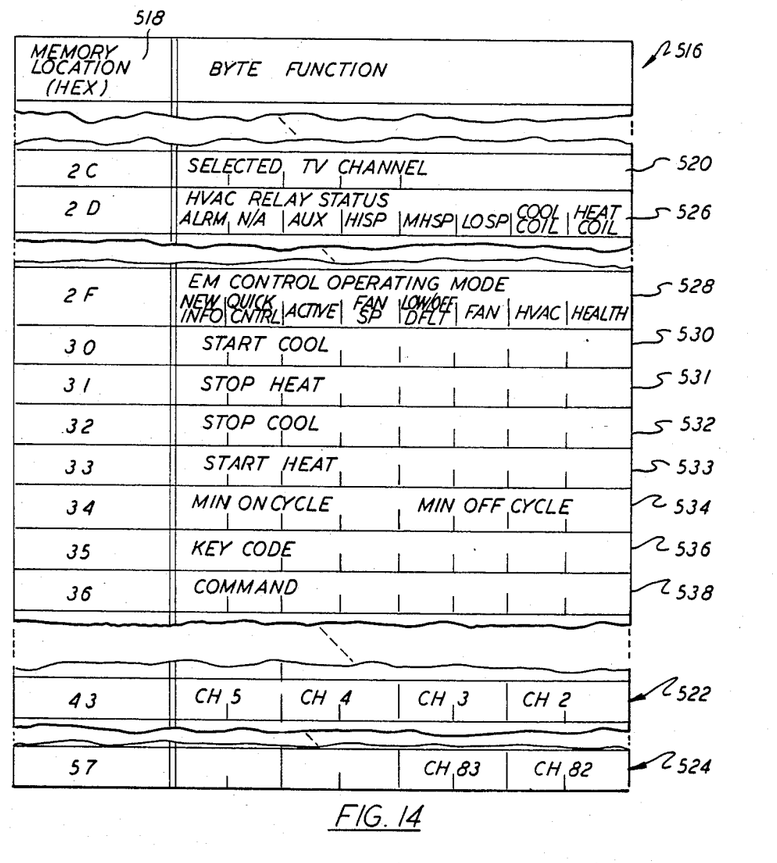
FIG. 14 is an illustration of another feature of the embodiment of FIG. 5.

FIG. 14 illustrates a portion of the "memory map" for the EM control unit memory (346, FIG. 9). The illustration is necessarily abbreviated; including only some of the major functional features of the EM control located (HEX addresses 518) in memory. The mapped functions include: registration of the present selected television channel by monitoring the remote control (IR signal) in byte 520, and twenty-one bytes (HEX addresses 43–57) relating to television channel status, as illustrated by bytes 522–524. The twenty-one bytes, with four television channels provide a "mask" for the spectrum of available TV channels. The individual channel status (selected/not selected) is updated with each channel change by the room occupant. With this feature the central control system may regulate channel viewing. With the EM unit operating in a selectable "direct access scan mode" each channel selection is recorded in the mask bytes 522–524. The EM unit reports the selection to the PBX main signal processor. If the selected channel is not censored, i.e. prohibited or subject to a subscriber tarrif (such as cable) the PBX main processor writes the channel value to the selected TV channel byte 520, followed by an EXEC CHANNEL command (execute the channel selection) causing the EM unit to use its direct access, IR remote control capability (182, FIG. 5) to change the channel. If the selected channel is censored the system will not allow selection. In this manner the PBX central control, i.e. attendant's console, or the PMS, has the ability to censor TV viewing. Of course the censored channel data is alterable and easily changed through console input.

The FIG. 14 map illustrates the HVAC functions, including: HVAC relay status byte 526, EM operating mode 528, the start/stop, heat and cool temperature set point bytes 530–533, and the HVAC fan cycle time limits 534. The HVAC status byte 526 is a register for keypad (220, FIG. 13) commands from the telset (172, FIG. 5). The PBX main processor reads the HVAC status and takes the appropriate action. For example, in response to a heat (warmer) key depression new start heat and stop heat temperature values are written into set point temperature bytes 533, 531, in addition to lighting lamp 498 of the heat key 494. The lamp reminas lighted until the sensed room temperature equals the stop heat value, and it then turned off.

The memory map also includes a table of defined "key code" and associated "command" indicia, as shown by mapped bytes 536, 538. The key providing the command from the telset faceplate is identified by the key code. Although in the case of dedicated key commands the source key need not be identified it is desirable to have a defined key code=command relationship in memory, which is alterable by the PBX main processor. In this way the central location may reprogram one or more keys on one or more of the telsets, thereby providing a further degree of flexibility to the present control system.

The centralized control system of the present invention provides the utmost in flexibility in providing central control over remote located operation systems. The inability to provide interconnection between central and remote is no longer a concern since the combination PBX control system uses the building's existing telephone wiring. This provides for minimum installation costs together with low equipment cost, resulting from the combined functions; a voice and data PBX with simultaneous secondary port control capability, each function invisible to the other.

It should be understood that the TDM telephone system used in the present invention may include any one of a number of TDM formats, including pulse code modulation (PCM), in addition to the ADM format described in the best mode embodiment. The adaption to PCM being well known to those skilled in the art.

Similarly, although the invention has been shown and described with respect to a best mode embodiment thereof, is should be understood by those skilled in the art that various other changes, omissions, and additions to the form and detail thereof, may be made therein without departing from the spirit and scope of the invention.

APPENDIX A
ACTION LIST for each TRANSACTION

| TRANSACTION (TABLE 1) | ACTION NO. (TABLE 2) |
|---|---|
| (1) NEW TEMP REQUESTED: | |
| Determine of new DESIRED TEMP | (36) |
| Set new DESIRED TEMP in Database | (40) |
| Calculate new Limit temp. | (44) |
| Set new states of hotter/cooler lamps | (48) |
| Set Limit temp. to EM-3 | (64) |
| Send HVAC duration & FIC/FFC to EM-3 | (72) |
| (2) NEW FAN SPEED REQUESTED: | |
| Set new FAN STATUS in Database | (60) |
| Send new fan speed to EM-3 | (68) |
| (3) FAN OFF REQUESTED: | |
| Set new FAN STATUS in Database | (60) |
| Send new fan speed to EM-3 | (68) |
| (4) TEMPERATURE UP: | |
| Set new ACTUAL TEMP in Database | (52) |
| (5) TEMPERATURE DOWN: | |
| Set new ACTUAL TEMP in Database | (52) |
| (6) EM INITIALIZATION: | |
| Set SPD Broadcast Mode for TV keys | (4) |
| (7) SMOKE ALARM ON: | |
| Alert LX-MC | (80) |
| (8) SMOKE ALARM OFF: | |
| Do nothing | (0) |
| (9) DEADBOLT LOCKED: | |
| Set Occupied info in ROOM STATUS | (24) |
| Calculate new Limit temp. | (44) |
| Send Limit temp. to EM-3 | (88) |
| Send HVAC duration, FIC/FFC to EM-3 | (72) |
| Turn off Door Unlocked lite | (92) |
| (10) DEADBOLT UNLOCKED: | |
| Reset Occupied info in ROOM STATUS | (28) |
| Calculate new Limit temp. | (44) |
| Send Limit temp. to EM-3 | (64) |
| Send HVAC duration, FIC/FFC to EM-3 | (72) |
| Turn on Door Unlocked lite | (88) |

APPENDIX A
ACTION LIST for each TRANSACTION

| TRANSACTION (TABLE 1) | ACTION NO. (TABLE 2) |
|---|---|
| (11) DOOR OPEN: | |
| Set Inactive info in ROOM STATUS | (16) |
| Calculate new Limit temp. | (44) |
| Send Limit temp. to EM-3 | (64) |
| Send HVAC duration, FIC/FFC to EM-3 | (72) |
| (12) DOOR CLOSED: | |
| Reset Inactive info in ROOM STATUS | (20) |
| Calculate new Limit temp. | (44) |
| Send Limit temp. to EM-3 | (64) |
| Send HVAC duration, FIC/FFC to EM-3 | (72) |
| (13) WINDOW OPEN: | |
| Set Inactive info in ROOM STATUS | (16) |
| Calculate new Limit temp. | (44) |
| Send Limit temp. to EM-3 | (64) |
| Send HVAC duration, FIC/FFC to EM-3 | (72) |
| (14) WINDOW CLOSED: | |
| Reset Inactive info in ROOM STATUS | (20) |
| Calculate new Limit temp. | (44) |
| Send Limit temp. to EM-3 | (64) |
| Send HVAC duration, FIC/FFC to EM-3 | (72) |
| (15) CHECK IN: | |
| Set Registered info in ROOM STATUS | (8) |
| Set DESIRED TEMP to default temp. | (32) |
| Calculate new Limit temp. | (48) |
| Set FAN STATUS to default fan speed | (56) |
| Send Limit temp. to EM-3 | (64) |
| Send new fan speed to EM-3 | (68) |
| Send HVAC duration, FIC, FFC to EM-3 | (72) |
| Send "quick-control" command to EM-3 | (76) |
| (16) CHECK OUT: | |
| Reset Registered info in ROOM STATUS | (12) |
| Set DESIRED TEMP to default temp. | (32) |
| Calculate new Limit temp. | (44) |
| Set state of hotter/cooler lamps | (48) |
| Set FAN STATUS to default fan speed | (56) |
| Send Limit temp. to EM-3 | (64) |
| Send new fan speed to EM-3 | (68) |
| Send HVAC duration, FIC/FFC to EM-3 | (72) |
| (17) EM INACTIVE: | |
| Set Inactive info in ROOM STATUS | (16) |
| Calculate new Limit temp. | (44) |
| Send Limit temp. to EM-3 | (64) |
| Send HVAC duration, FIC/FFC to EM-3 | (72) |
| (18) EM START-UP: | |
| Set SPD Broadcast Mode for TV Keys | (4) |
| Set DESIRED TEMP to default | (32) |
| Calculate new Limit temp. | (44) |
| Set new state of HOTTER/COOLER lites | (48) |
| Set FAN STATUS to default speed | (56) |
| Send Limit temp. to EM-3 | (64) |
| Send fan speed to EM-3 | (68) |
| Send HVAC duration, FIC/FFC | (72) |
| (19) EM ACTIVE: | |
| Reset Inactive info in ROOM STATUS | (20) |
| Calculate new Limit temp. | (44) |
| Send Limit temp. to EM-3 | (64) |
| Send HVAC duration, FIC/FFC to EM-3 | (72) |
| (20) ROOM OCCUPIED: | |
| Set Occupied info in ROOM STATUS | (24) |
| Calculate new Limit temp. | (44) |
| Send Limit temp. to EM-3 | (64) |
| Send HVAC duration, FIC/FFC to EM-3 | (72) |
| (21) ROOM UNOCCUPIED: | |
| Reset Occupied info in ROOM STATUS | (28) |
| Calculate new Limit temp. | (44) |
| Send Limit temp. to EM-3 | (64) |
| Send HVAC duration, FIC/FFC to EM-3 | (72) |
| (22) SET SENSOR HI: | |
| The ON transaction for that sensor will be executed | |
| (23) SET SENSOR LO: | |
| The OFF transaction for that sensor will be executed | |

We claim:

1. Control system apparatus for regulating a remote controlled device, comprising:
   central console means responsive to operator entry signals;
   time division multiplexed (TDM) telephone system, including private branch exchange (PBX) signal processing means, PBX memory means, and PBX matrix switch having primary ports for exchanging primary port signals including system data signals and system control signals between said central console, said PBX signal processor, and said station equipment, said PBX signal processing means providing said control signals alternatively as PBX control signals and as secondary port control signals which include said operator entry signals, said station equipment having a station port, a secondary port, and station signal processing means responsive to said primary port signals for transferring received secondary port control signals to said secondary port, received primary port data signals to said station port, and for transferring signals received at said secondary port and said station port to said PBX matrix; and
   remote control means, connected for response to the secondary port of associated station equipment and to the remote controlled device, and including,
   sensor means for providing sensed value signals of controlled device operating parameters,
   control unit memory means, and
   control unit signal processing means for periodically sampling, and storing in said control unit memory means, said secondary port control signals and said sensed signals, to provide regulation of said controlled device in dependence thereon, and to present said stored sensed signals to said secondary port on request of said PBX signal processing means.

2. The apparatus of claim 1, wherein said secondary port control signals each include: one or more control signal frames comprising a transaction message signal.

3. The apparatus of claim 1, further comprising:
   keypad means disposed on said station equipment means and having input means responsive to remote site, operator entered command information corresponding to an operator selected operating state for one or more of the controlled devices being regulated by said remote control unit associated with said station means; and wherein
   said station signal processing means presents said keypad command signals to said secondary port for transmission to said remote control unit, said remote control unit signal processing means receiving said keypad command signals and altering the operation of the selected control device in dependence thereon in combination with said secondary port control signals received from said PBX signal processing means.

4. The apparatus of claim 1, wherein said PBX telephone system TDM format is an adaptive delta modulation format.

5. The apparatus of claim 1, wherein said PBX telephone system TDM format is a pulse code modulation format.

6. The apparatus of claim 1, wherein said station equipment means comprises telset means for providing said data signals received from said PBX matrix switch as voice signals to said station port, and wherein said station equipment means signal processor responds to said PBX control signals to regulate transfer of said voice signals to and from said station port.

* * * * *